United States Patent Office 2,891,952
Patented June 23, 1959

---

2,891,952
PHENTHIAZINE DERIVATIVES

Paul Gailliot, Paris, Jean Robert, Gentilly, and Jacques Gaudechon, Thiais, France, assignors to Societe des Usines Chimiques Rhone-Poulenc, Paris, France, a French body corporate No Drawing. Application July 11, 1957
Serial No. 671,136

Claims priority, application France July 19, 1956

6 Claims. (Cl. 260—243)

This invention relates to new derivatives of phenthiazine and to processes for their production.

It is known that various 10-aminoalkyl-phenthiazines possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It is an object of the present invention to provide new phenthiazine derivatives which possess useful pharmacological properties. It is a further object of the invention to provide processes for the production of these new compounds.

The phenthiazine derivatives of the present invention are those which conform to the formula:

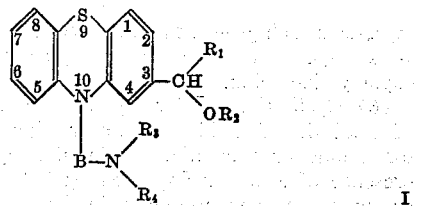

and their salts and their quaternary ammonium derivatives (wherein $R_1$ represents a hydrogen atom or an alkyl group, $R_2$ represents an alkyl group, $R_3$ and $R_4$ are the same or different and either each represents a lower alkyl group or one of $R_3$ and $R_4$ represents a hydrogen atom and the other represents a lower alkyl group or $R_3$ and $R_4$ together with the adjacent nitrogen atom collectively represent a heterocyclic group such as pyrrolidino, piperidino, morpholino, piperazino, 4-alkylpiperazino, 4-hydroxyalkylpiperazino or 4-acyloxyalkylpiperazino, and B represents a straight or branched chain divalent aliphatic hydrocarbon group containing two to four carbon atoms (such, for example, as ethylene, propylene, isobutylene, trimethylene or tetramethylene) unsubstituted or substituted by a group

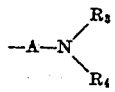

wherein A represents a single bond or a methylene group and $R_3$ and $R_4$ are as hereinbefore defined.

The terms "alkyl and acyl" as used in this specification and in the appended claims embrace solely alkyl and acyl groups that contain at most four and five carbon atoms respectively.

The new phenthiazine compounds of the present invention may be prepared by the application of methods known per se for the production of 10-aminoalkylphenthiazines. The majority of methods so applied can be described generically as consisting in reacting a phenthiazine derivative of general formula:

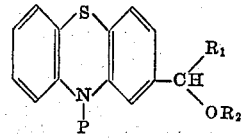

with a compound Q, the groups P and Q being such that Q will react with the phenthiazine derivative so as to introduce the substituent

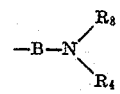

or a substituent easily convertible into

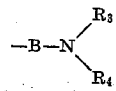

in the 10-position and, if necessary, thereafter transforming the convertible substituent into

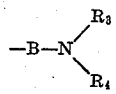

Preferred processes of manufacture are as follows;

(1) Alkylation of a 3-hydroxyalkylphenthiazine corresponding to general Formula I in which $R_2$ represents a hydrogen atom and the other groups are as hereinbefore defined. The reaction is advantageously carried out by conversion of the hydroxy group into a more reactive substituent such as a halogen atom and condensation of the halogen derivative thus obtained with a metal alcoholate or with an alcohol in the presence of an alkali metal hydroxide. When the grouping

represents a 4-hydroxyalkylpiperazinyl group this group may conveniently be protected by for example tetrahydropyranylation.

(2) Interaction of a 3-alkoxyalkylphenthiazine of the general formula:

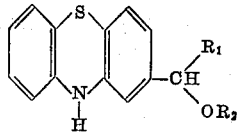

(wherein $R_1$ and $R_2$ are as hereinbefore defined) with a halogenamine of the formula:

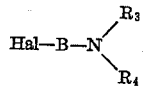

(where Hal represents a halogen atom and the other symbols are as hereinbefore defined) in the form of the base or of a salt thereof.

The reaction may be carried out with or without a solvent and in the presence or absence of a condensing agent. It is advantageous to operate in an aromatic hydrocarbon solvent medium (for example, benzene, toluene or xylene) in the presence of a condensing agent, preferably in the form of an alkali metal or derivative thereof (such as, for example, hydride, amide, hydroxide, alcoholate or metal alkyl or aryl) and especially in the form of metallic sodium, sodamide, powdered sodium or potassium hydroxide, lithium hydride, sodium tert-butylate, butyllithium or phenyllithium. The reaction is preferably carried out at the boiling temperature of the solvent. It is advantageous to use the halogenoamine in the form of the free base in solution, for example, in benzene, toluene or xylene, and to add this to the mixture of the other reactants in which the phenthiazine reactant of Formula III may already be present, at least in part, in the form of an alkali metal salt. The reaction may also be carried out using a salt of the halogenoamine but in this case a greater proportion of the condensing agent must clearly be used in order to neutralize the acid of the salt employed.

In the case where the divalent aliphatic hydrocarbon group —B— is an asymmetric branched chain, such for example

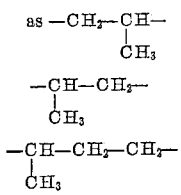

or

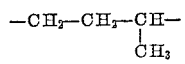

isomerisation can take place during the course of the reaction with the formation of a mixture of isomers. This isomerisation is analogous to that which takes place in the preparation of promethazine by the condensation of phenthiazine with a dimethylaminohalogenopropane [Charpentier, C.R. 225, 306 (1947)], a process which, using either 2-dimethylamino-1-chloropropane or 1-dimethylamino-2-chloropropane as starting material, gives the same final mixture in which promethazine predominates. Separation of the isomers may be effected by, for example fractional crystallisation of salts such as the hydrochlorides from a suitable solvent such as alcohol.

(3) Decomposition of an aminoalkylphenthiazine-10-carboxylate of the formula:

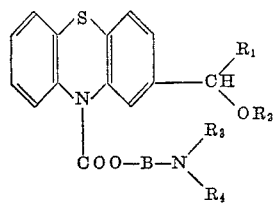

(where the various symbols are as hereinbefore defined) by heating the carboxylate to a temperature above 100° C., and preferably between 150 and 220° C. There is no advantage in operating at higher temperatures which can often cause strong coloration of the reaction products.

The reaction can be effected with the phenthiazine-10-carboxylate alone, i.e. without a diluent, or in an inert medium such as o-dichlorobenzene, diphenyl or diphenyl oxide, or in the classical diluents for decarboxylation, such, for example, as quinoline or weak bases of high boiling point.

During the course of the decomposition of the phenthiazine-10-carboxylate an isomerisation, similar to that hereinbefore described in process (2), takes place when the divalent aliphatic hydrocarbon group B is an asymmetric branched chain.

The phenthiazine-10-carboxylates employed as starting materials may be obtained by known methods. For example, they may be prepared by the action of a halide (or an ester) of the corresponding phenthiazine-10-carboxylic acid on the appropriate aminoalcohol; or by the action of a halogenoalkyl ester of such an acid on the appropriate secondary amine.

(4) Interaction of an amine of the formula

(wherein $R_3$ and $R_4$ are as hereinbefore defined) and a reactive ester of the general formula:

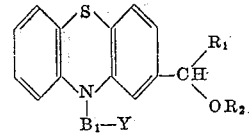

(wherein $R_1$ and $R_2$ are as hereinbefore defined, Y represents a residue of a reactive ester such as a halogen atom or a sulphonic ester residue and $B_1$ represents a straight or branched divalent aliphatic hydrocarbon group containing two to four carbon atoms or such a grouping substituted by a group —A—$Y_1$, A being as hereinbefore defined and $Y_1$ being a residue of a reactive ester or a grouping

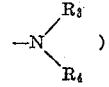

(5) Alkylation by known methods of the corresponding primary or secondary amines, i.e. those compounds of Formula I in which the grouping(s)

represents groups such as amino, monoalkylamino or piperazino, leading to the production of compounds in which the grouping(s)

represents such groups as monoalkylamino, dialkylamino, 4-alkylpiperazino, 4-hydroxyalkylpiperazino or 4-acyloxyalkylpiperazino.

(6) Cyclisation, preferably in a solvent in the form of a substituted amide of a lower aliphatic acid such as formamide or acetamide, or in dimethylaniline, in the presence of a condensing agent (alkali metal hydroxide or carbonate) and optionally in the presence of a catalyst such as copper powder, of a derivative of general formula:

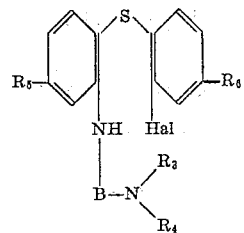

(wherein one of the groups $R_5$ and $R_6$ represents a hydrogen atom and the other represents the group

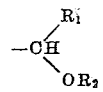

Hal represents a halogen atom (for example, chlorine or bromine) and the other symbols are as hereinbefore defined).

(7) In the case of the 4-acyloxyalkylpiperazino derivatives, acylation of the derivatives in which the grouping(s)

are 4-hydroxyalkylpiperazino groups.

Certain of the compounds conforming to general Formula I have an asymmetric carbon atom in the chain B, such as those compounds with the branched chain

or

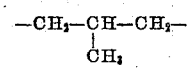

and consequently can exist in optically active forms. The invention includes within its scope the racemates as well as the correspondingly optically active isomers of such compounds. The optically active isomers may be obtained by e.g. methods (2) and (4) described above by commencing with starting materials which are themselves optically active. They may also be prepared by optical resolution of the corresponding racemates.

The products prepared according to the invention have valuable pharmacodynamic properties. They have, in particular, a powerful action on the central nervous system, which renders them generally useful as neuroleptics, as potentiators of general anaesthetics (for example, hexobarbitone and ether) and analgesics (for example, morphine), and as anti-emetics. Certain of them are also spasmolytics and antihistaminics.

Compounds of the invention which are outstanding in their action on the central nervous system are those in which the group B is of the form —CH$_2$—CH$_2$—CH$_2$— or

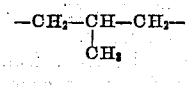

the grouping

represents dimethylamino, diethylamino, 4-methylpiperazino, 4-hydroxyethylpiperazino or 4-acetoxyethylpiperazino and R$_1$ and R$_2$ are as hereinbefore defined. Compounds of the invention in which the grouping

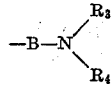

represents

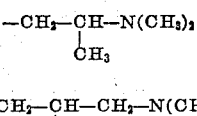

or

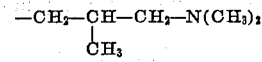

are powerful antihistaminics.

Finally, those in which the group

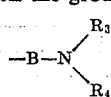

contains a group

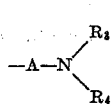

in particular those in which the group

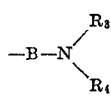

represents a bis-(dialkylamino)propyl group, and more particularly a 2:3-bis-(dimethylamino)propyl group, are especially useful as spasmolytics, as may be shown experimentally by their antagonistic action against spasm of the isolated rabbit intestine provoked by acetyl choline or barium chloride.

For therapeutic purposes, the bases of general Formula I are preferably employed in the form of acid addition salts containing pharmaceutically acceptable anions (such as hydrochlorides and other hydrohalides, 8-chlorotheophyllinates, phosphates, nitrates, sulphates, maleates, fumarates, citrates, tartrates, oxalates, methanesulphonates and ethanedisulphonates) or of quaternary ammonium salts obtained by reaction with organic halides (e.g. methyl or ethyl iodide, chloride or bromide or allyl or benzyl chloride or bromide) or other reactive esters conveying pharmaceutically acceptable anions.

The following examples show how the invention may be put into practice. Unless otherwise indicated the melting points stated were determined on the Kofler bench.

*Example I*

A solution of 3-(1-chlorethyl)-10-(3-dimethylaminopropyl)phenthiazine hydrochloride (2 g.) in methanol (20 cc.) is added over a period of 15 minutes at ordinary temperature to a solution of potassium (0.84 g.) in methanol (10 cc.).

The solution is then heated for 17 hours under reflux with stirring. After cooling, the methanol is distilled off in vacuo and the residue taken up with water (50 cc.) and ether (50 cc.). After vigorous shaking, the ethereal layer is decanted, washed with water (10 cc.) and dried over sodium sulphate and the ether is distilled off on the water-bath.

The crude oily base obtained is purified by conversion to the oxalate in acetone. 3-(1-methoxyethyl)-10-(3-dimethylaminopropyl)phenthiazine oxalate (1.85 g.), M.P. 193–194° C. (Maquenne block), is thus obtained.

3 - (1 - chloroethyl) - 10 - (3 - dimethylaminopropyl)-phenthiazine hydrochloride, M.P. 173–174° C. (Maquenne block), which serves as the starting material for the preceding product, is obtained by the action of thionylchloride in chloroform on 3-(1-hydroxyethyl)-10-(3-dimethylaminopropyl)phenthiazine; the hydrochloride formed is precipitated from the chloroform solution by the addition of anhydrous ether.

*Example II*

The following mixture is heated for 20 hours under reflux:

3 - (1 - chloroethyl) - 10 - (3 - dimethylaminopropyl)phenthiazine hydrochloride _____ g__ 5
Pure potassium hydroxide pellets_____ g__ 2.3
Pure ethanol _____ cc__ 80

After cooling, the ethanol is distilled in vacuo and the residue is treated with water (100 cc.) and ether (100 cc.). The ethereal layer is decanted and extracted with N hydrochloric acid (100 cc.). The hydrochloric acid extract is made alkaline with sodium hydroxide ($d=1.33$, 15 cc.) and the oily base which precipitates is extracted with ether (100 cc. followed by 50 cc.). The combined ethereal extracts are washed with water (2 x 20 cc.) and dried over anhydrous sodium sulphate. After distillation of the ether on the water-bath the crude base is purified by conversion into the oxalate in acetone. After recrystallisation from ethanol, there is obtained 3 - (1 - ethoxyethyl) - 10 - (3 - dimethylaminopropyl)-phenthiazine oxalate (2.8 g.), M.P. 165–166° C. (Maquenne).

*Example III*

A solution of 3-methoxymethylphenthiazine (12.15 g.) in anhydrous xylene (150 cc.) is heated under reflux and treated with sodamide (2.4 g.). A solution of 1-dimethylamino-3-chloropropane (7.3 g.) in anhydrous xylene (30 cc.) is then added over 40 minutes. The mixture is heated under reflux for 3 hours, cooled and is then treated with water (100 cc.) and hydrochloric acid ($d=1.19$, 12 cc.). The xylene phase is separated and the aqueous phase is made alkaline with sodium hydroxide ($d=1.33$, 16 cc.). The liberated base is extracted with ether (2 x 100 cc.), the ethereal extracts are dried over anhydrous sodium sulphate, concentrated to dryness and the residue is distilled in vacuo. There is thus obtained 3-methoxymethyl-10-(3-dimethylaminopropyl)phenthiazine (13.45 g.), B.P. 205–215° C./0.4 mm. Hg.

The hydrochloride, prepared in ethanol, is a white crystalline powder which melts at 135° C.

The 3-methoxymethylphenthiazine used, M.P. 124° C., is obtained by the action of methyl iodide upon the sodium derivative of 3-hydroxymethylphenthiazine in anhydrous xylene.

Example IV

Proceeding as in Example III but commencing with 3-methoxymethylphenthiazine (12.15 g.) and 1-methyl-4-(3-chloropropyl)piperazine (10.6 g.), there is obtained 3 - methoxymethyl - 10 - (3 - 4' - methyl - 1' - piperazinylpropyl)phenthiazine (14.7 g.), B.P. 248–252° C./0.6 mm. Hg, whose di-hydrochloride melts at 192–194° C.

Example V

Proceeding as in Example III but commencing with 3-methoxymethylphenthiazine (12.15 g.) and 1-dimethylamino-2-methyl-3-chloropropane (8.15 g.), there is obtained 3 - methoxymethyl - 10 - (3 - dimethylamino - 2-methyl-propyl)phenthiazine (13.6 g.), B.P. 202–209° C./0.5 mm. Hg, whose acid oxalate melts at 124° C.

Example VI

Proceeding as in Example III but commencing with 3-methoxymethylphenthiazine (20.9 g.) and 1:3-bis-(dimethylamino)-2-chloropropane (16.95 g.), there is obtained 3 - methoxymethyl - 10 - [2:3 - bis - (dimethylamino)propyl]phenthiazine (31.6 g.), B.P. 210–218° C./0.3 mm. Hg, whose acid oxalate melts at 199° C. and acid maleate at 113° C.

Example VII

Proceeding as in Example III but commencing with 3-ethoxymethylphenthiazine (12.85 g.) and 1-dimethylamino - 3 - chloropropane (7.3 g.), there is obtained 3 - ethoxymethyl - 10 - (3 - dimethylaminopropyl)phenthiazine (14.8 g.), B.P. 205–211° C./0.9 mm. Hg, whose acid oxalate melts at 139° C.

The 3-ethoxymethylphenthiazine used, M.P. 120° C., is obtained by the action of ethyl iodide upon the sodium derivative of 3-hydroxymethylphenthiazine in anhydrous xylene.

Example VIII

A solution of 3-diethylaminopropyl 3-methoxymethylphenthiazinyl-10-carboxylate (6 g.), prepared by the action of 3-diethylamino-1-propanol upon 3-methoxymethylphenthiazine-10-carbonylchloride, in o-dichlorobenzene (30 cc.) is heated under reflux for 2 hours. After cooling the solution is extracted with N hydrochloric acid (2 x 30 cc.).

The base is liberated from the aqueous hydrochloric acid solution with sodium hydroxide (d=1.33) and extracted with ether (2 x 30 cc.). The extracts are dried over anhydrous sodium sulphate and the solvent is removed by distillation in vacuo.

There is obtained 3-methoxymethyl-10-(3-diethylaminopropyl)phenthiazine (2.6 g.) whose acid oxalate melts at 158° C.

Example IX

A solution of 3-(3-methoxymethyl-10-phenthiazinyl)-propyl toluene-p-sulphonate (8.7 g.) and 1-(2-hydroxyethyl)piperazine (7.4 g.) in anhydrous toluene (120 cc.) is heated under reflux for 3 hours. After cooling the mixture is washed with distilled water (100 cc. followed by 2 x 50 cc.) and the toluene layer is extracted with 0.5 N hydrochloric acid (100 cc.).

The base is liberated from the aqueous hydrochloric acid solution with sodium hydroxide (d=1.33, 7.3 cc.) and extracted with chloroform (2 x 25 cc.). The extracts are dried over anhydrous sodium sulphate and the chloroform is removed by distillation in vacuo. There is obtained 10-(3-4'-hydroxyethyl-1'-piperazinylpropyl)-3-methoxymethyl-phenthiazine (6.75 g.) whose acid dimaleate melts at 172° C.

We claim:
1. 3 - (1 - methoxyethyl) - 10 - (3 - dimethylaminopropyl)phenthiazine.
2. 3-methoxymethyl-10-(3-dimethylaminopropyl)phenthiazine.
3. 3 - methoxymethyl - 10 - (3 - 4' - methyl - 1' - piperazinylpropyl)phenthiazine.
4. 3 - methoxymethyl - 10 - (3 - dimethylamino - 2-methylpropyl)phenthiazine.
5. 3 - methoxymethyl - 10 - (3 - 4' - hydroxyethyl - 1'-piperazinylpropyl)phenthiazine.
6. A phenthiazine derivative selected from the class consisting of compounds of the general formula:

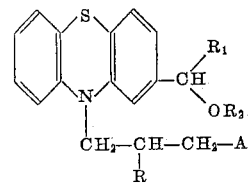

wherein $R_1$ is selected from the class consisting of hydrogen atoms and methyl groups, $R_2$ is selected from the class consisting of methyl groups and ethyl groups, R is selected from the class consisting of hydrogen atoms and methyl groups and A is selected from the class consisting of dimethylamino, 4-methylpiperazino and 4-hydroxyethylpiperazino groups, and acid addition salts thereof having pharmaceutically acceptable anions.

References Cited in the file of this patent

UNITED STATES PATENTS

| 2,534,237 | Cusic | Dec. 19, 1950 |
| 2,645,640 | Charpentier | July 14, 1953 |
| 2,789,978 | Rath | Apr. 23, 1957 |

OTHER REFERENCES

Burger et al.: J. Org. Chem., vol. 19, No. 2, p. 1842 (1954).